Feb. 14, 1950      J. WAGNER      2,497,749
HAND AND FINGER SHIELD
Filed Jan. 30, 1948
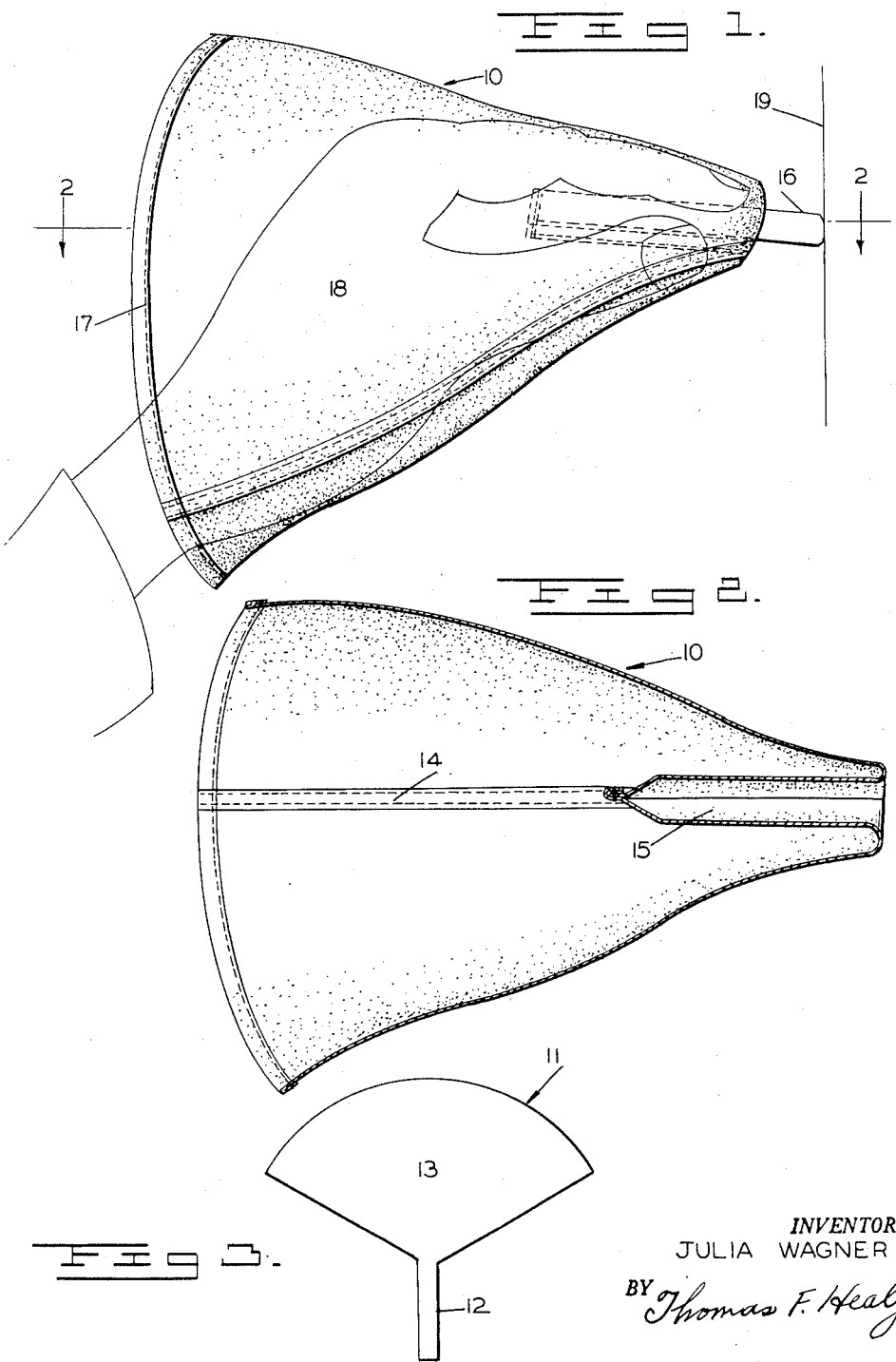
INVENTOR.
JULIA WAGNER
BY *Thomas F. Healy*
ATTORNEY Patented Feb. 14, 1950

2,497,749

UNITED STATES PATENT OFFICE 2,497,749

HAND AND FINGER SHIELD

Julia Wagner, Hazleton, Pa.

Application January 30, 1948, Serial No. 5,251

2 Claims. (Cl. 2—16)

The present invention relates to a hand and finger shield.

The primary object of the present invention is to provide a simple and inexpensive shield for the hand and fingers, adapted to be used in writing on a blackboard, or the like, to prevent dust from the writing element contacting or soiling the fingers or hand of the user.

Another object of the present invention is to provide a finger and hand shield manufactured from a blank consisting of a single piece of flexible material and including an elongated arm merging into an outwardly flaring portion, which portion can be turned over and sewed in any suitable manner to provide the final product.

Another object is to provide as a new article of manufacture a hand and finger shield consisting of a body portion composed of a single piece of flexible material being substantially funnel-shaped in assembled form ready for use, with said funnel-shaped body including an elongated inwardly extending finger disposed at the smaller end thereof and adapted to receive a piece of chalk, or other writing material.

Another object is to provide a hand and finger shield comprising, a body portion composed of flexible material with a finger disposed inwardly of said body portion and adapted to receive a writing element.

Other and further objects and advantages of the present invention will be apparent from the following description thereof and from the claims appended thereto.

In the drawing wherein like numerals refer to like or corresponding parts;

Figure 1 is a side elevation of the hand and finger shield showing the shield in ready-to-use form, and embodying the features of the present invention;

Figure 2 is a sectional view taken along the line 2—2 of Figure 1, in the direction of the arrows; and Figure 3 is a plan view of the single piece of material, somewhat reduced, for making up the hand and finger shield.

Referring to the drawing, the numeral 10 generally represents the hand and finger shield which embodies the features of the present invention, and is composed of a flexible material, such as rubber, flexible plastics, or the like, and may be in any desired color, and is preferably washable. The body portion 10 of the hand and finger shield is preferably composed of a single piece of flexible material indicated generally by the numeral 11, as shown in Figure 3. The single piece of material 11 has an elongated lower portion 12 merging into an outwardly flaring portion 13, so that the hand and finger shield in assembled form, ready for use, is substantially funnel shaped. The portion 13 is turned over on itself and the free side edges are fastened together in any suitable manner, as by stitching 14. The elongated element 12 of the single piece of material 11 is likewise turned over on itself and is sewed together at the free side edges thereof and at the bottom portion, so as to provide an elongated finger or cavity 15 which is adapted to receive a piece of chalk 16, or other writing element and extends inwardly to be within the funnel-shaped portion formed from portion 13.

If desired, the marginal edges of the funnel-shaped shield may be turned over on themselves and stitched as indicated at 17.

In assembled form, ready for use, the hand and finger shield is substantially funnel-shaped and is adapted to receive the hand 18 of the user who can grasp the finger or pocket 15 with the thumb and forefinger and thus firmly hold the chalk 16 disposed in said inwardly extending finger 15 preparatory to writing on the blackboard 19. Due to the flexibility of the hand and finger shield 10, and particularly finger 15, as the chalk or other writing element, such as a crayon, wears down through use, it can be advanced forwardly in the finger 15. The chalk 16 is thus slid outwardly in the cavity 15 until it is so small in dimensions that it can no longer be conveniently gripped by the thumb and forefinger of the user. When this occurs, a new piece of chalk can be inserted in the cavity or finger 15, which cavity 15 again extends inwardly within the body of the foldable and flexible hand and finger shield 10.

It is to be understood that the size of the blank 11 may vary depending upon the use to which the hand and finger shield is to be put. The elongated piece 12 of the blank 11 may be varied in dimensions, with a corresponding change in the dimensions of the piece 13 so that the completed hand and finger shield may be used with paint brushes, or the like. For example, if the hand and finger shield is to be employed with a paint brush for painting houses, or the like, the dimensions of the blank 11 may be changed so that the elongated cavity 15 has the proper dimensions to receive the handle of the paint brush. It is to be noted that the dimensions of the flaring portion 13 are made in proportion to the object inserted in the cavity 15 so as to protect the user from substances which might soil the fingers or the hands.

The main concept of the present invention embraces the feature of providing a hand and finger shield which is composed of a flexible and washable material, and is inexpensive to make, and is adapted to keep dust from a writing element away from the fingers and hands of the user. The shield is particularly useful for school teachers who have to write on blackboards, or the like. The shield may also be employed by artists for holding paint brushes, colored crayons, or the like, when painting or drawing.

Various modifications of the present invention will be apparent to those skilled in the art without departing from the spirit thereof and it is therefore desired to be limited only by the scope of the appended claims.

What I claim is:

1. A hand and finger shield comprising, a body portion composed of a single piece of flexible material being substantially funnel-shaped in assembled form ready for use, and said funnel-shaped body including an inwardly extending finger disposed at the smaller end thereof and being proportioned to snugly receive a writing element and to snugly engage the writing element throughout substantially its entire circumference and substantially the major portion of the length thereof for permanently supporting the writing element in operable association therewith.

2. For use with a piece of chalk, a hand and finger shield comprising, a body portion composed of a single piece of flexible material of substantially funnel-shape, the smaller end portion thereof being folded inwardly to lie within the body portion and being closed at its inner end to provide a closed finger for receiving said chalk, the walls of said body portion and said finger being spaced apart to admit the fingers and thumb of the user therebetween, the part of the body portion adjacent the outer end of the finger providing a continuous bridging wall between the body portion and the finger to prevent dust from the chalk entering the space between the walls of the body portion and the finger, the internal diameter of the finger being proportioned so that the inner surface of the wall of the finger is adapted to snugly engage the chalk throughout its entire circumference for substantially its entire length for permanently supporting the chalk therein in operable association with the shield, said finger being flexible and of a material to permit the chalk to be fed outwardly of the finger by squeezing the portion of the finger adjacent to and rearwardly of the inner end of the chalk.

JULIA WAGNER.

REFERENCES CITED

The following references are of record in the file of this patent:

UNITED STATES PATENTS

| Number | Name | Date |
|---|---|---|
| 416,849 | Neale | Dec. 10, 1889 |
| 1,260,881 | Doty | Mar. 26, 1918 |
| 1,333,872 | Overton | Mar. 16, 1920 |

FOREIGN PATENTS

| Number | Country | Date |
|---|---|---|
| 473,906 | Germany | Mar. 27, 1929 |
| 500,413 | Great Britain | Feb. 8, 1939 |